US012809595B2

(12) United States Patent
Moore et al.

(10) Patent No.: US 12,809,595 B2
(45) Date of Patent: Nov. 24, 2026

(54) METHODS, SYSTEMS AND DEVICES FOR GENERATING COMPUTER CODE UTILIZING ARTIFICIAL INTELLIGENCE (AI)

(71) Applicant: JPMorgan Chase Bank, N.A., New York, NY (US)

(72) Inventors: Devin Christopher Moore, Columbus, OH (US); Stacy A. Kandel, Easton, PA (US)

(73) Assignee: JPMorgan Chase Bank, N.A., New York, NY (US)

( * ) Notice: Subject to any disclaimer, the term of this patent is extended or adjusted under 35 U.S.C. 154(b) by 191 days.

(21) Appl. No.: 18/396,045

(22) Filed: Dec. 26, 2023

(65) Prior Publication Data

US 2025/0208836 A1 Jun. 26, 2025

(51) Int. Cl.

*G06F 8/35* (2018.01)
*G06F 8/36* (2018.01)
*G06F 8/75* (2018.01)

(52) U.S. Cl.

CPC .................. *G06F 8/35* (2013.01); *G06F 8/36* (2013.01); *G06F 8/75* (2013.01)

(58) Field of Classification Search

None

See application file for complete search history.

(56) References Cited

U.S. PATENT DOCUMENTS

| | | | | |
|---|---|---|---|---|
| 6,651,244 | B1 * | 11/2003 | Smith | G06F 8/75 714/38.1 |
| 11,392,375 | B1 * | 7/2022 | Serna | G06F 8/71 |
| 12,431,131 | B1 * | 9/2025 | Balasubramaniam | G10L 15/197 |
| 12,579,974 | B1 * | 3/2026 | Lu | G10L 15/183 |
| 2013/0311224 | A1 * | 11/2013 | Heroux | G06Q 30/018 705/7.15 |
| 2016/0224453 | A1 * | 8/2016 | Wang | G06F 11/3604 |
| 2024/0319970 | A1 * | 9/2024 | Watson | G06F 8/35 |
| 2025/0045027 | A1 * | 2/2025 | Ngiam | G06F 11/3698 |
| 2025/0085934 | A1 * | 3/2025 | Kunz | G06F 8/35 |
| 2025/0245122 | A1 * | 7/2025 | Schaefer | G06F 9/44589 |
| 2025/0292015 | A1 * | 9/2025 | Muyal | G06F 40/20 |

* cited by examiner

*Primary Examiner* — Jason D Mitchell

(74) *Attorney, Agent, or Firm* — Guntin & Gust, PLC; Atanu Das

(57) ABSTRACT

Aspects of the subject disclosure may include, for example, receiving first user-generated input from a first communication device associated with a first user. The user-generated input comprises a prompt that indicates to generate computer code. Further embodiments can include searching a cache comprising a group of computer code based on the prompt, determining that there are no cache search results associated with the computer code in response to the searching of the cache, and generating the computer code utilizing an artificial intelligence software application. Other embodiments are disclosed.

20 Claims, 10 Drawing Sheets

100

200

300

400

500-1

800

METHODS, SYSTEMS AND DEVICES FOR GENERATING COMPUTER CODE UTILIZING ARTIFICIAL INTELLIGENCE (AI)

FIELD OF THE DISCLOSURE

The subject disclosure relates to methods, systems, and devices for generating computer code utilizing artificial intelligence (AI).

BACKGROUND

Utilizing Generative AI can be cost-prohibitive at a grand scale across a company as it intensively utilizes computer processing and memory resources. Further, the results from utilizing generative AI can contain hallucinations, quality risks, hazards, etc. with unfiltered/unattended operation. The current state of the art requires operation personnel to intervene at every step to determine whether the work product requested by generative AI has been previously generated and curated, thereby avoiding unnecessarily burdening computer processing and memory resources.

BRIEF DESCRIPTION OF THE DRAWINGS

Reference will now be made to the accompanying drawings, which are not necessarily drawn to scale, and wherein.

DETAILED DESCRIPTION

Figure 1:
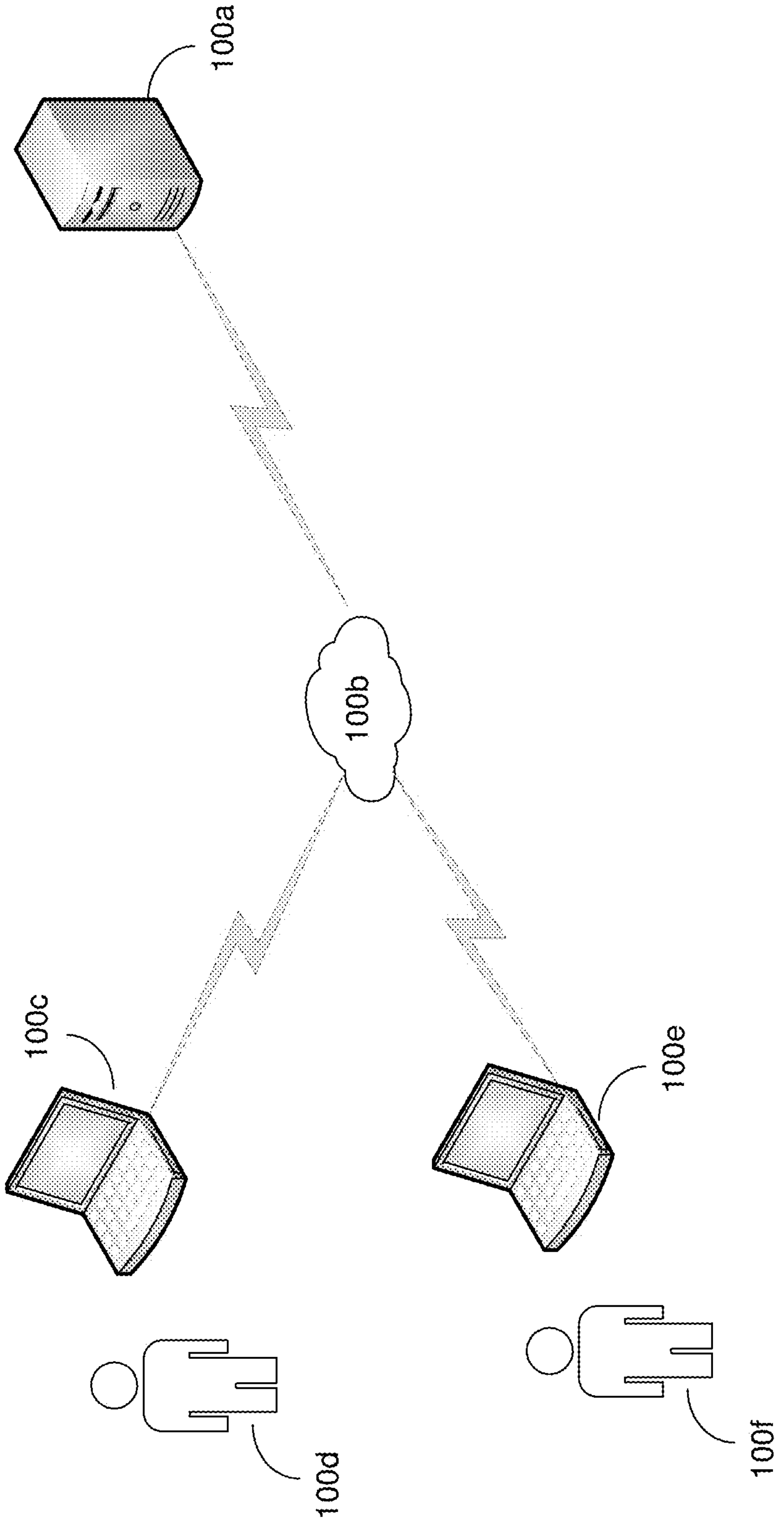
FIG. 1 is a block diagram illustrating an exemplary, non-limiting embodiment of a system for generating computer code utilizing AI in accordance with various aspects described herein.

The subject disclosure describes, among other things, illustrative embodiments for receiving first user-generated input from a first communication device associated with a first user. The first user-generated input comprises a prompt that indicates to generate computer code. Further embodiments can include searching a cache comprising a group of computer code based on the prompt. Additional embodiments can include determining that there are no cache search results associated with the computer code in response to the searching of the cache, and generating the computer code utilizing an artificial intelligence software application. Other embodiments are described in the subject disclosure.

One or more aspects of the subject disclosure include a device, comprising a processing system including a processor, and a memory that stores executable instructions that, when executed by the processing system, facilitate performance of operations. The operations can comprise receiving first user-generated input from a first communication device associated with a first user. The first user-generated input comprises a prompt that indicates to generate computer code. Further operations can comprise searching a cache comprising a group of computer code based on the prompt. Additional operations can comprise determining that there are no cache search results associated with the computer code in response to the searching of the cache, and generating the computer code utilizing an artificial intelligence software application.

One or more aspects of the subject disclosure include a non-transitory machine-readable medium, comprising executable instructions that, when executed by a processing system including a processor, facilitate performance of operations. The operations can comprise receiving first user-generated input from a first communication device associated with a first user. The user-generated input comprises a prompt that indicates to generate computer code. Further operations can comprise searching a cache comprising a group of computer code based on the prompt, and determining that there are no cache search results associated with the computer code in response to the searching of the cache. Additional operations can comprise generating the computer code utilizing an artificial intelligence software application, receiving second user-generated input from a second communication device associated with a second user, and adjusting the computer code based on the second user-generated input resulting in an adjusted computer code.

One or more aspects of the subject disclosure include a method. The metho can comprise receiving, by a processing system including a processor, first user-generated input from a first communication device associated with a first user. The user-generated input comprises a prompt that indicates to generate computer code. Further, the method can comprise searching, by the processing system, a cache based on the prompt, and determining, by the processing system, that there are cache search results associated with the computer code in response to the searching of the cache. The cache search results include a portion of the group of computer code. In addition, the method can comprise identifying, by the processing system, the computer code from the cache search results, and providing, by the processing system, the computer code to a second communication device associated with a second user. Also, the method can comprise receiving, by the processing system, second user-generated input from the second communication device, adjusting, by the processing system, the computer code based on the second user-generated input resulting in an adjusted computer code, and providing, by the processing system, the adjusted computer code to the first communication device.

FIG. 1 is a block diagram illustrating an exemplary, non-limiting embodiment of a system 100 for generating computer code utilizing AI in accordance with various aspects described herein. In one or more embodiments, system 100 comprises a server 100*a* communicatively coupled, over a communication network 100*b*, to a communication device 100*c* associated with a user 100*d*. Further, server 100*a* can be communicatively coupled, over the communication network 100*b*, to communication device 100*e* associated with user 100*f*. Communication network 100*b* can comprise a wireless communication network, a wired communication network, or a combination thereof. In addition, each of a communication device 100*c* and communication device 100*e* can comprise a laptop computer, a desktop computer, a tablet computer, a smartphone, a mobile phone, a mobile device, or any other computing device. Also, server 100*a* can comprise one or more servers located in one location, one or more servers spanning multiple locations, one or more virtual servers located in one location, one or more virtual servers spanning multiple locations, one or cloud servers, or a combination thereof.

In one or more embodiments, the server 100*a* can receive user-generated input from communication device 100*c* that was inputted by user 100*d*. Further, user 100*d* may be a computer programmer that would like an AI software application residing on server 100*a* to generate computer code for a specific purpose. The user-generated input can comprise a prompt that indicates to generate computer code associated with the prompt for the specific purpose. The server 100*a* can search a cache comprising a group of computer code based on the prompt. The cache may be memory associated with the server 100*a* or may be a separate database communicatively coupled to the server 100*a* over a communication network 100*b* stores the group of computer code. The server 100*a* searching the cache is attempting to determine whether computer code already exists (with the stored group of computer code) based on the prompt and/or the specific purpose indicated in the prompt. If so, the server 100*a* can avoid implementing the AI software application to generate the computer code, thereby avoiding utilizing scarce computer processing and memory resources of server 100*a*. Further, the server 100*a* can determine that there are no cache search results associated with the computer code in response to the searching of the cache. That is the computer code indicated in the prompt does not exist within the stored group of computer code. Consequently, the server 100*a* can generate the computer code utilizing the AI software application.

In one or more embodiments, the server 100*a* can provide the generated computer code to communication device 100*e* associated with user 100*f*. Further, user 100*f* may be a quality assurance personnel that reviews/validates/improves the generated computer code. In addition, the server 100*a* can receive user-generated input from the second communication device. The user-generated input can provide or otherwise indicate manual corrections (i.e., fixes) of the computer code. Also, the server 100*a* can adjust the computer code based on the user-generated input resulting in an adjusted computer code. That is, the server 100*a* can implement the manual corrections indicated in the user-generated input to adjust the computer code.

In one or more embodiments, the server 100*a* can provide the adjusted computer code to the communication device 100*c* so that user 100*d* can incorporate the adjusted computer code into an application for the specific purpose indicated in the prompt. Further, the server 100*a* can store the adjusted computer code in the cache as part of the stored group of computer code, so that it can be reused by users, thereby avoiding implementation of the AI software application to unnecessarily using computer processor and memory resources in the future.

In one or more embodiments, the server 100*a*, can receive user-generated input from communication device 100*c* provided by user 100*d*. The user-generated input comprises a prompt that indicates to generate computer code associated with the prompt for a specific purpose. Further, the server 100*a*, can search the cache comprising a group of computer code based on the prompt. In addition, the server 100*a* can determine that there are cache search results associated with the computer code in response to the searching of the cache. The cache search results include a portion of the group of computer code stored in the cache. In addition, the server 100*a* can identify the computer code from the cache search results.

In one or more embodiments, the server 100*a* can provide the computer code to communication device 100*e* to be reviewed by user 100*f*. Further, the server 100*a* can receive user-generated input from the second communication device by user 100*f*. The user-generated input can indicate manual correction (i.e., fixes) for the computer code. In addition, the server 100*a* can adjust the computer code based on the user-generated input resulting in an adjusted computer code that implements the manual corrections indicated by the user-generated input provided by user 100*f*. Also, the server 100*a* can provide the adjusted computer code to communication device 100*c* for user 100*d* to incorporate into a software application for the specific purpose.

In one or more embodiments, the server 100*a* can select an AI model from a group of AI models for the AI software application to generate the computer code according to the received prompt. The server 100*a* can select the AI model based on the available computer processor capacity and available memory of the server 100*a*. That is, some AI models from the group of AI models require more computer processor capacity and/or memory while others may not. Thus, the server 100*a* can select an AI model accordingly.

In one or more embodiments, the AI software application can generate computer code according to the received prompt. However, in other embodiments, the AI software application can generate other artifacts (e.g., other than computer code) according to the received prompt. Other artifacts can include, but not limited to, images, videos, text, emails, presentations, etc.

Figure 2:
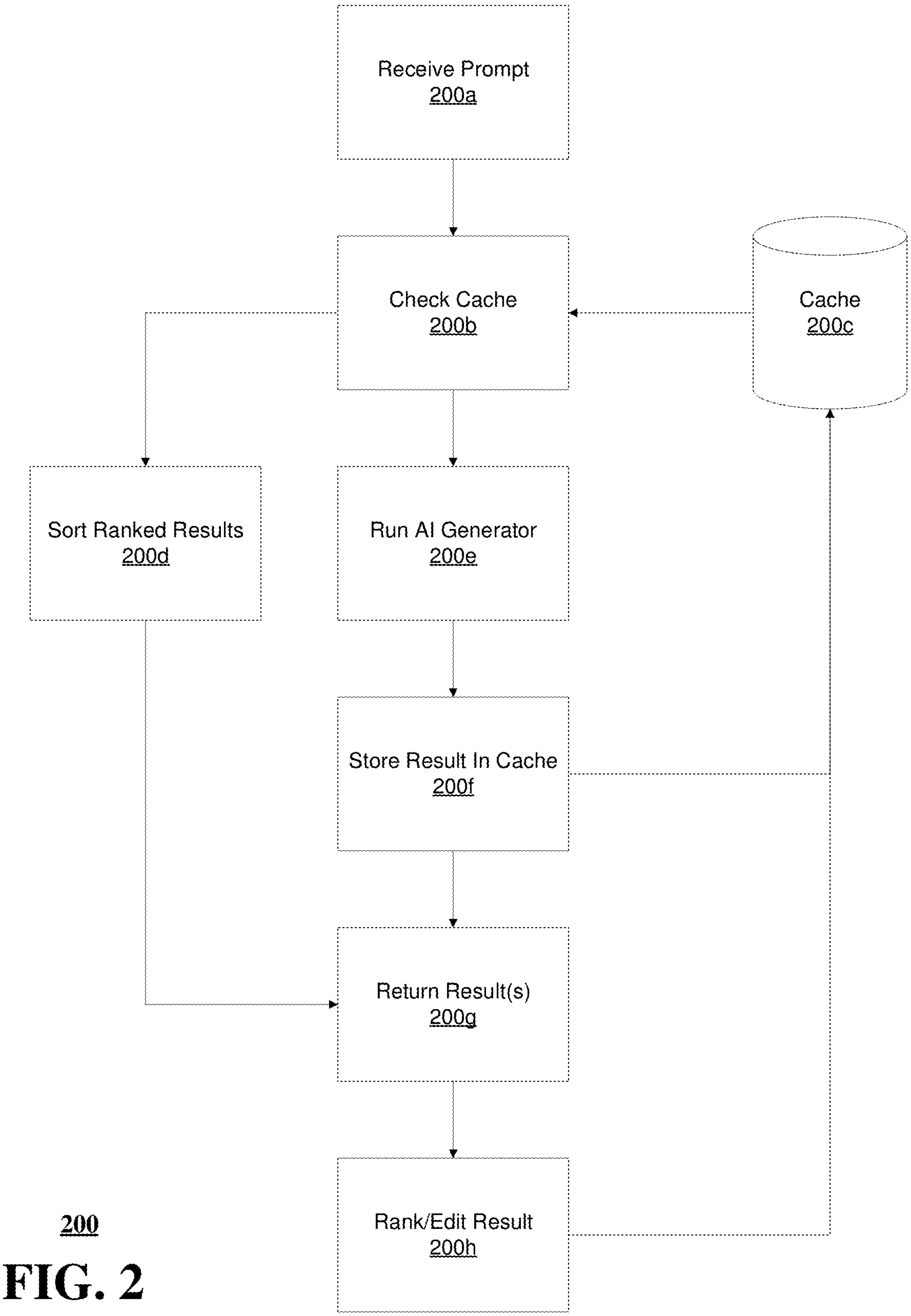
FIGS. 2, 3, 4, 5A, 5B, 6A, and 6B depict illustrative embodiments of method in accordance with various aspects described herein.

FIGS. 2, 3, 4, 5A, 5B, 6A, and 6B depict illustrative embodiments of method in accordance with various aspects described herein. Referring to FIG. 2, the method 200 can be implemented by a server. The server can receive, at 200*a*, user-generated input from a communication device that was inputted by user. Further, user may be a computer programmer that would like an AI software application residing on server to generate computer code for a specific purpose. The user-generated input can comprise a prompt that indicates to generate computer code associated with the prompt for the specific purpose. The server, at 200*b*, can check a cache 200*c* comprising a group of computer code based on the prompt. The cache 200*c* may be memory associated with the server or may be a separate database communicatively coupled to the server over a communication network. By searching the cache, the server is attempting to determine whether computer code already exists based on the prompt and/or the specific purpose indicated in the prompt. If so, the server can avoid implementing the AI software application to generate the computer code, thereby avoiding utilizing scarce computer processing and memory resources of server 100*a*.

In one or more embodiments, the server, at 200*d*, can determine that there are cache search results associated with the computer code in response to the searching of the cache and sort/rank the search results. The cache search results include a portion of the group of computer code. Further, the server can identify computer code from the sorted/ranked search results according to the prompt and, at 200*g*, provide/return the result (e.g., identified computer code) to the communication device for the user to incorporate into a software application for the specific purpose indicated in the prompt. In some embodiments, the return result can provide or otherwise indicate a single piece of computer code. In other embodiments, the return result can provide or otherwise indicate multiple pieces of computer code.

In one or more embodiments, the server, at 200*e*, can determine that there are no cache search results associated with the computer code in response to the checking of the cache. Consequently, the server 100*a*, at 200*e*, runs a generative AI software application, resulting in a generated computer code/result. In some embodiments, the result can provide or otherwise indicate a single piece of generated computer code. In other embodiments, the result can provide or otherwise indicate multiple pieces of generated computer code. Further, the server, at 200*f*, can store the result in the cache 200*c*. In addition, the server, at 200*g*, provides/returns the result to the communication device for the user to incorporate into a software application for the specific purpose indicated in the prompt. In addition, the server, at 200*h*, can indicate to the cache 200*c* a ranking or edits associated with the result/computer code (especially when the result includes multiple pieces of generated computer code).

Figure 3:
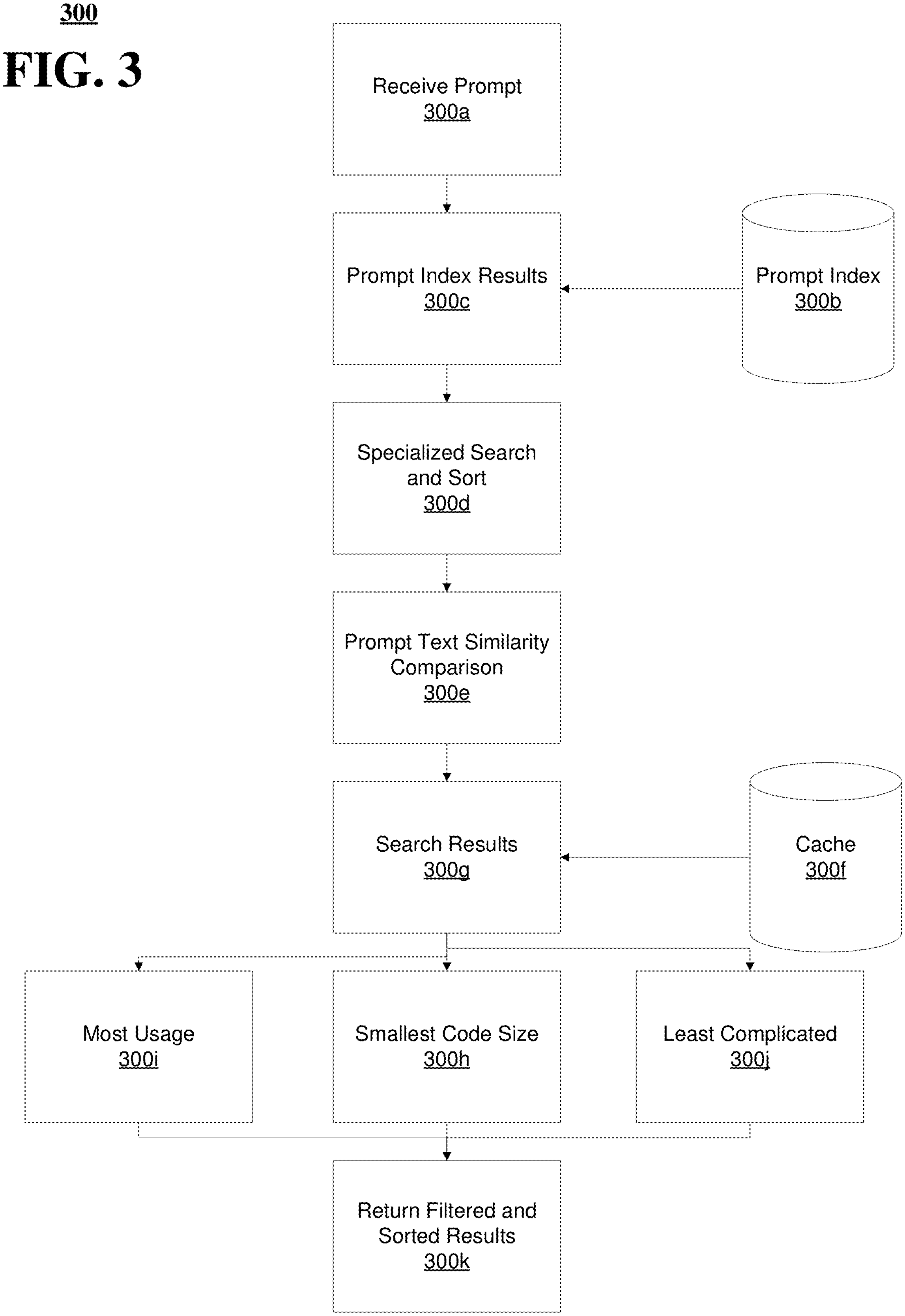

Referring to FIG. 3, the method 300 can be implemented by a server. The server can receive, at 300*a*, user-generated input from a communication device that was inputted by user. Further, user may be a computer programmer that would like an AI software application residing on server to generate computer code for a specific purpose. The user-generated input can comprise a prompt that indicates to generate computer code associated with the prompt for the specific purpose. The server, at 300*c*, searches a prompt index database 300*b* to determine a prompt index results that can be a list of previously received prompts that may be similar to the received prompt. Further, the server, at 300*d*, can implement a specialized search and sort of the prompt index results. In addition, the server, at 300*e*, can conduct a prompt text similarity comparison between each of the prompt index results and the received prompt resulting in a list of prompts. In addition, the server, 300*g*, obtains search results of multiple pieces of computer code from cache 300*f* based on the lists of prompts.

In one or more embodiments, the server can filter and/or sort the search results of multiple pieces of computer code from the cache 300*f*. This can include the server, at 300*i*, identifying computer code from the search results based on most usage. Further, the server, at 300*h*, can identify computer code from the search results based on smallest code size. In addition, the server, at 300*j*, can identify computer code from the search results based on least complexity (e.g., least number of conditional (if-then) statements). Also, the server, at 300*k* can provide/return the filtered and sorted results of the multiple pieces of computer code from the cache to the communication device that provided the prompt so that the user can incorporate the at least one or more of the multiple pieces of computer code into a software application for the specific purpose.

Figure 4:
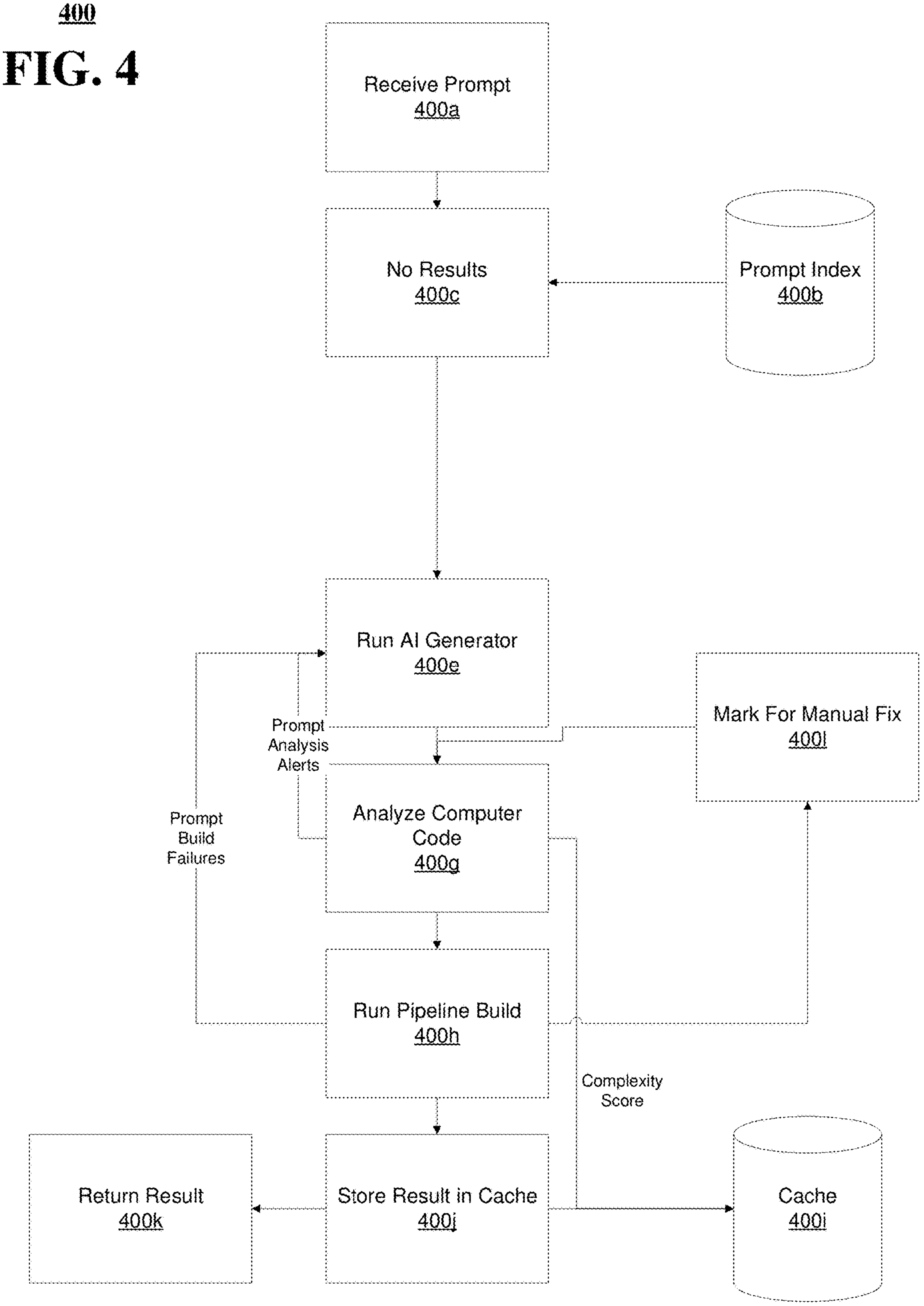

Referring to FIG. 4, the method 400 can be implemented by a server. The server can receive, at 400*a*, user-generated input from a communication device that was inputted by user. Further, user may be a computer programmer that would like an AI software application residing on server to generate computer code for a specific purpose. The user-generated input can comprise a prompt that indicates to generate computer code associated with the prompt for the specific purpose. The server, at 400*c*, can search a prompt index database 400*b* to determine whether there are prompt index results that can be a list of previously received prompts that may be similar to the received prompt. The server can determine that there are no prompt index results.

In one or more embodiments, the server, at 400*e*, can run a generative AI software application to generate computer code (or generate multiple pieces of generated computer code) based on the received prompt. Further, the server, at 400*g*, can analyze the computer code to determine whether there are any quality assurance issues. These can include that the computer code is too complex (i.e., too many conditional statements), too large, not compliance with guidelines or procedures, etc. If there are any quality assurance issues, then the server may re-run the generative AI software application to regenerate the computer code based on the received prompt and the quality assurance issues. If there are no quality assurance issues, then the server, at 400*h*, can run a pipeline build. If there are any build failures, then the server can re-run the generative AI software application to regenerate the computer code based on the received prompt and the build failures. In addition, if there are any other build issues, the server, at 400*l*, can mark them for manual correction (e.g., fix). When the computer code is manually fixed (e.g., adjusted), then the server can re-analyze the computer code and re-run the pipeline build. If there are no pipeline build issues, the server, at 400*j*, can store the computer code/result in the cache 400*i*, and, at 400*k*, provide/return the result (which can include multiple pieces of generated code) to the communication device so the user can incorporate the at least a portion of the computer code into a software application for the specific purpose.

Figure 5A:
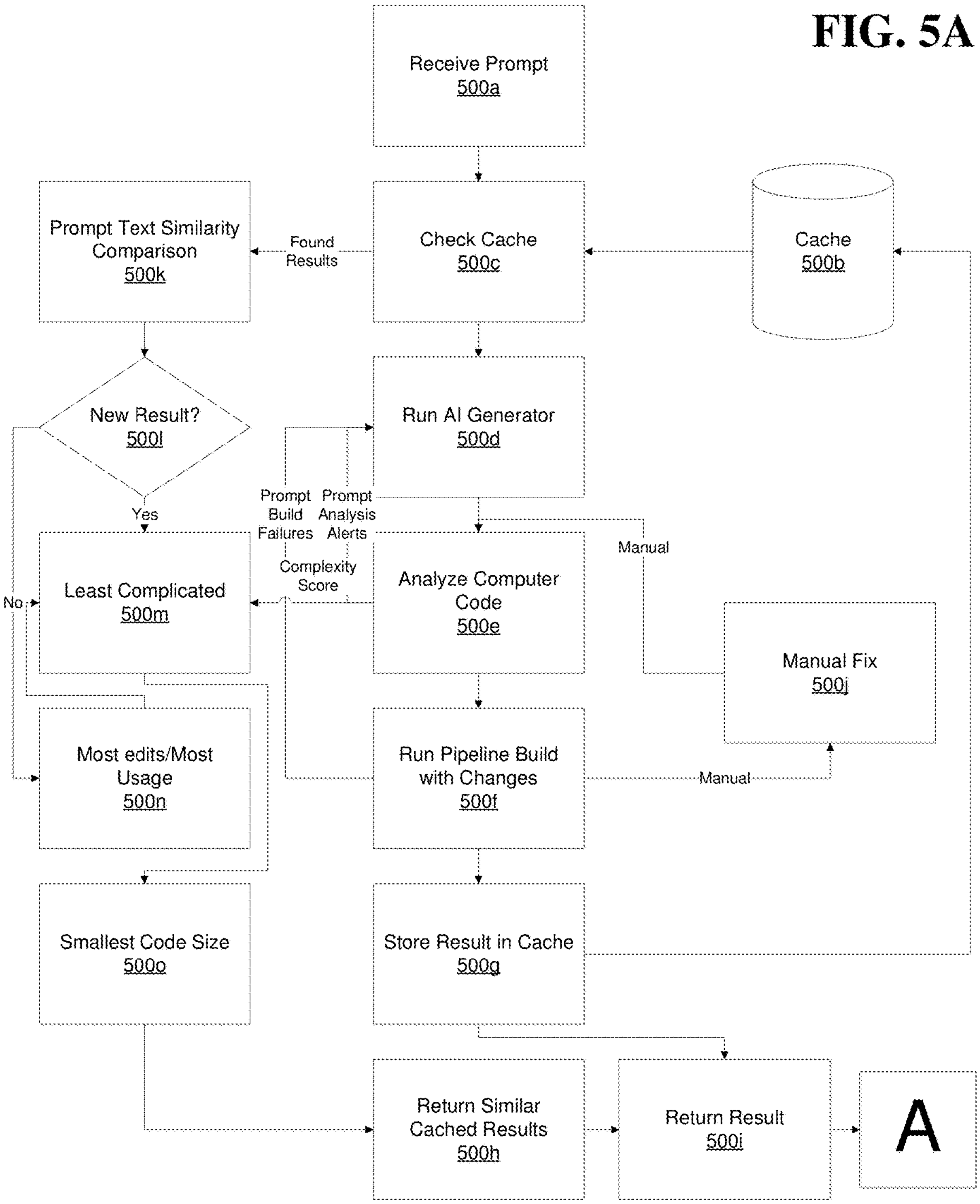

Referring to FIG. 5A, the method 500-1 can be implemented by a server. The server can receive, at 500*a*, user-generated input from a communication device that was inputted by user. Further, user may be a computer programmer that would like an AI software application residing on server to generate computer code for a specific purpose. The user-generated input can comprise a prompt that indicates to generate computer code associated with the prompt for the specific purpose. Further, the server, at 500*c*, can check a cache 500*b* to determine whether there any previously stored computer code that are associated with the received prompt. The cache 500*b* comprises a group of computer code. If search results are found, the server, at 500*k*, can conduct a prompt text similarity comparison between the received prompt and the search results. The search results can comprise multiple pieces of computer code that can be a portion of the group of computer code stored in the cache 500*b*. If the server, at 500*l*, determines that the search results are not that similar to the received prompt, thereby a new or different result, then the server, at 500*m*, determines the least complicated computer code from the search results. If the server, at 500*l*, determines that the search results is similar to the received prompt, then the server, at 500*n*, determines the most edited or most used computer code from the search results. Then the server, at 500*m*, determines the least complicated computer code from the most edited/most used computer code. In addition, the server, at 500*o*, determines the smallest code size from the least complicated computer code. Then the server, at 500*h*, return/provides the similar cached result(s) to the communication device for the user to incorporate at least of a portion into a software application for the specific purpose.

In one or more embodiments, if the server determines there are no cache results associated with the received prompt, then the server, at 500*d*, can run a generative AI software application to generate computer code based on the received prompt. In some embodiments, multiple pieces of computer code can be generated. Further, the server, at 500*e*, can analyze the computer code to determine whether there are any quality assurance issues. These can include that the computer code is too complex (i.e., too many conditional statements), too large, not compliance with guidelines or procedures, etc. If there are any quality assurance issues, then the server may re-run the generative AI software application to regenerate the computer code based on the received prompt and the quality assurance issues. If there are no quality assurance issues, then the server, at 500*f*, can run a pipeline build. If there are any build failures, then the server can re-run the generative AI software application to regenerate the computer code based on the received prompt and the build failures. In addition, if there are any other build issues, the server, at 500*j*, can mark them for manual correction (e.g., fix). When the computer code is manually fixed (e.g., adjusted), then the server can re-analyze the computer code and re-run the pipeline build. If there are no pipeline build issues, the server, at 500*g*, can store the computer code/result in the cache 500*b*, and, at 500*i*, provide/return the result (which can be multiple pieces of generated computer code) to the communication device so the user can incorporate the computer code into a software application for the specific purpose.

Figure 5B:
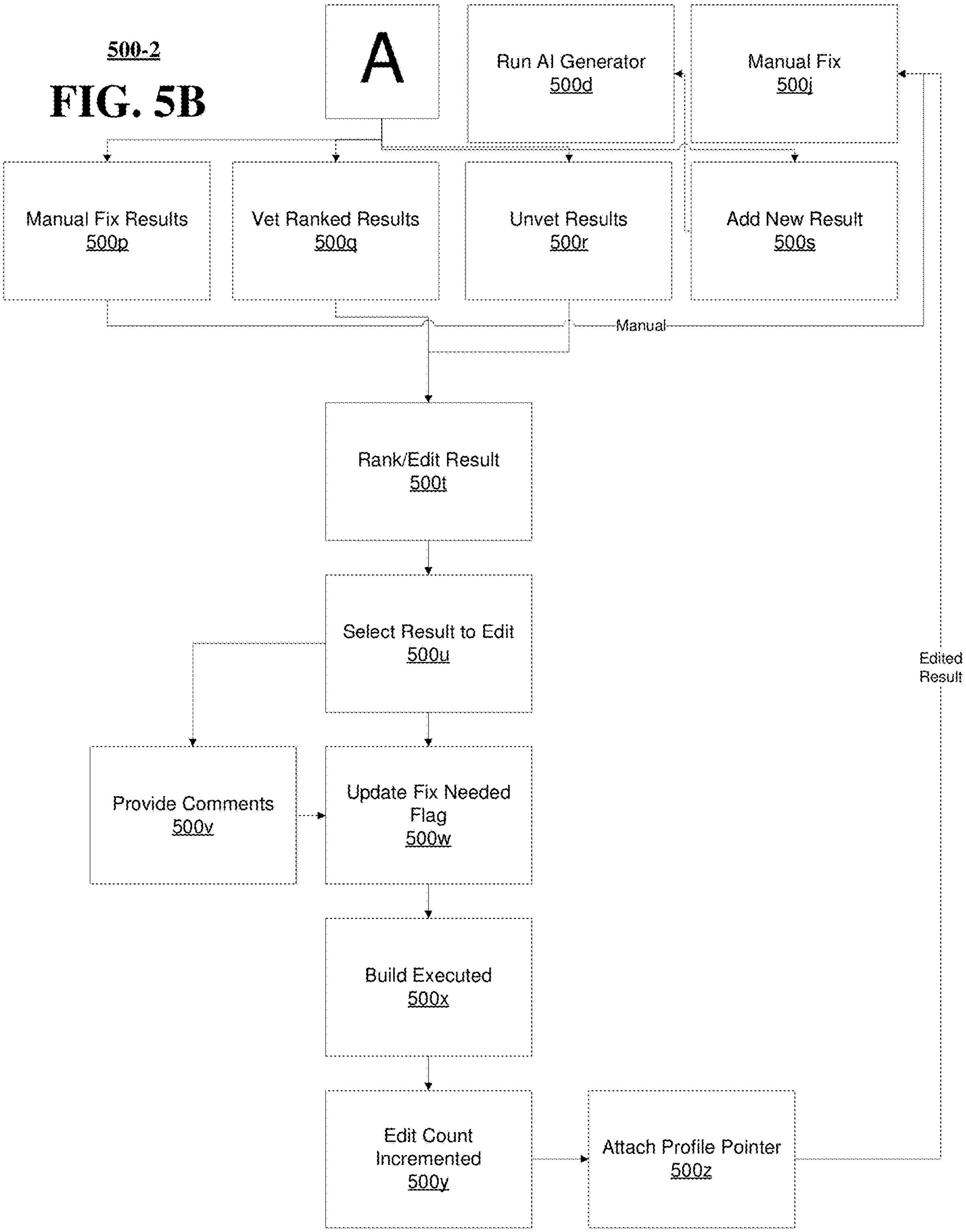

Referring to FIG. 5B, the method 500-2 can be implemented by a server. After returning/providing a result, the server can receive user-generated input from quality assurance personnel. Based on the user-generated input, the server, at 500*p*, can manually fix the results, at 500*q*, can vet the ranked results, at 500*r*, can unvet the results, and, at, 500*s*, add a new result (e.g., computer code). If a new result is added, the server can re-run the generative AI software application based on the new result. If the results are vetted or unvetted, then the server, at 500*t*, can rank/edit the results.

In one or more embodiments, the server, at 500*u*, can select result(s) to edit. Further, the server, at 500*v*, can provide/comments to the computer code. In addition, the server, at 500*w*, can update fix needed flag. Also, the server, at 500*x*, can execute the build of the computer code. Also, the server, at 500*y*, can increment the edit count. Further, the server, at 500*z*, can attach a profile pointer.

Figure 6A:
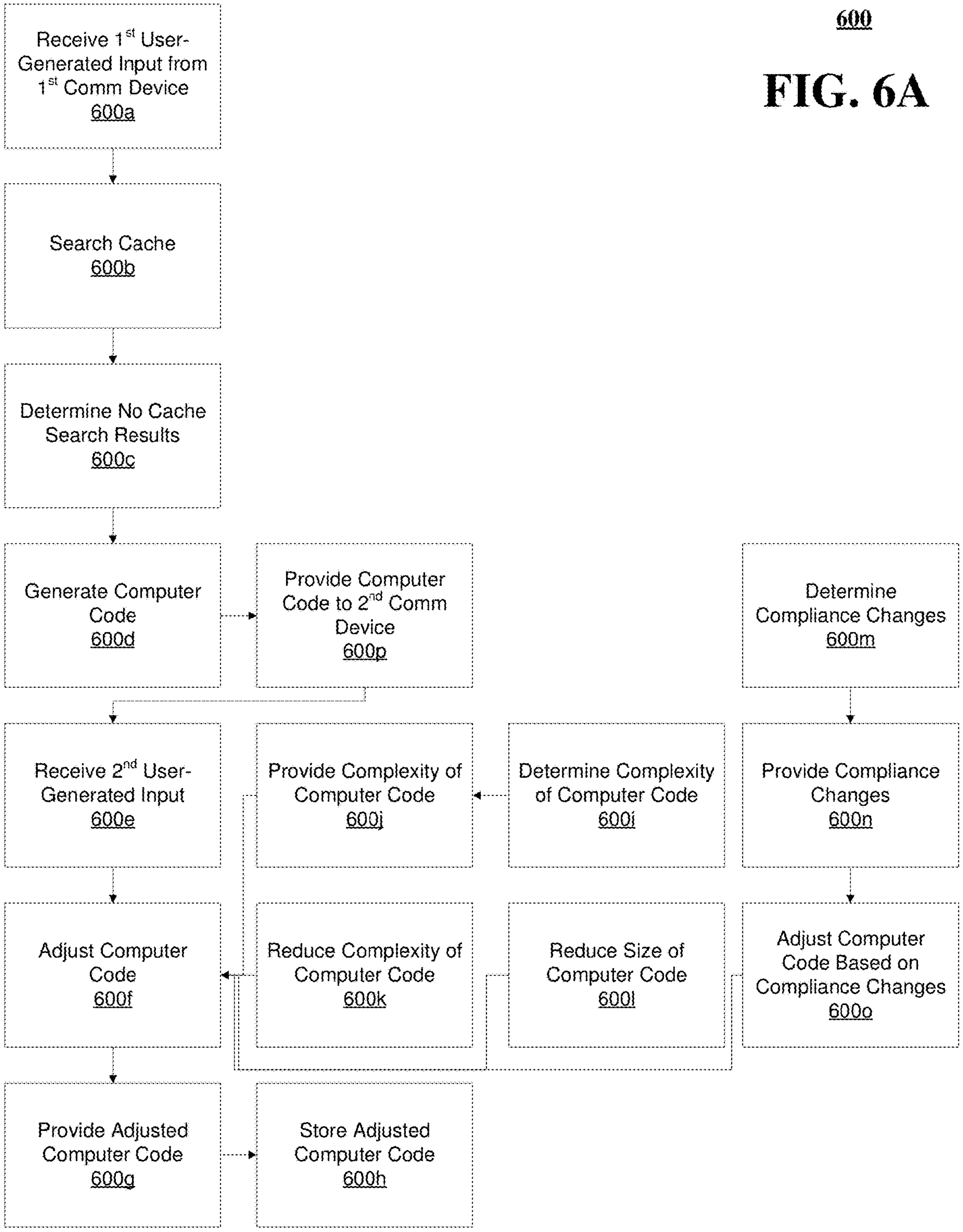

Referring to FIG. 6A, the method 600 can be implemented by a server. The method 600 can include the server, at 600*a*, receiving first user-generated input from a first communication device associated with a first user. The first user-generated input comprises a prompt that indicates to generate computer code. Further, the method 600 can include the server, at 600*b*, searching a cache comprising a group of computer code based on the prompt. In addition, the method 600 can include the server, at 600*c*, determining that there are no cache search results associated with the computer code in response to the searching of the cache. Also, the method 600 can include the server, at 600*d*, generating the computer code utilizing an artificial intelligence software application.

In one or more embodiments, the method 600 can include the server, at 600*p*, providing the computer code to a second communication device associated with a second user. Further, the method 600 can include the server, at 600*e*, receiving second user-generated input from the second communication device. In addition, the method 600 can include the server, at 600*f*, adjusting the computer code based on the second user-generated input resulting in an adjusted computer code.

In one or more embodiments, the method 600 can include the server, at 600*g*, providing the adjusted computer code to the first communication device. Further, the method 600 can include the server, at 600*h*, storing the adjusted computer code in the cache.

In one or more embodiments, the method 600 can include the server, at 600*i*, determining a complexity of the computer code. Further, the method 600 can include the server, at 600*j*, providing the complexity of the computer code to the second communication device. In some embodiments, the adjusting of the computer code comprises adjusting the computer code based on the complexity of the computer code.

In one or more embodiments, the method 600 can include the server, at 600*k*, reducing the complexity of the computer code. In some embodiments, the adjusting the computer code based on the complexity of the computer code comprises reducing the complexity of the computer code.

In one or more embodiments, the method 600 can include the server, at 600*l*, reducing a size of the computer code. In some embodiments, the adjusting the computer code based on the complexity of the computer code comprises reducing a size of the computer code.

In one or more embodiments, the method 600 can include the server, at 600*m*, determining compliance changes associated with the computer code. Further, the method 600 can include the server, at 600*n*, providing the compliance changes to the second communication device. In addition, the method 600 can include the server, at 600*o*, adjusting the computer code based on the compliance changes. In some embodiments, the adjusting of the computer code comprises adjusting the computer code based on the compliance changes.

Figure 6B:
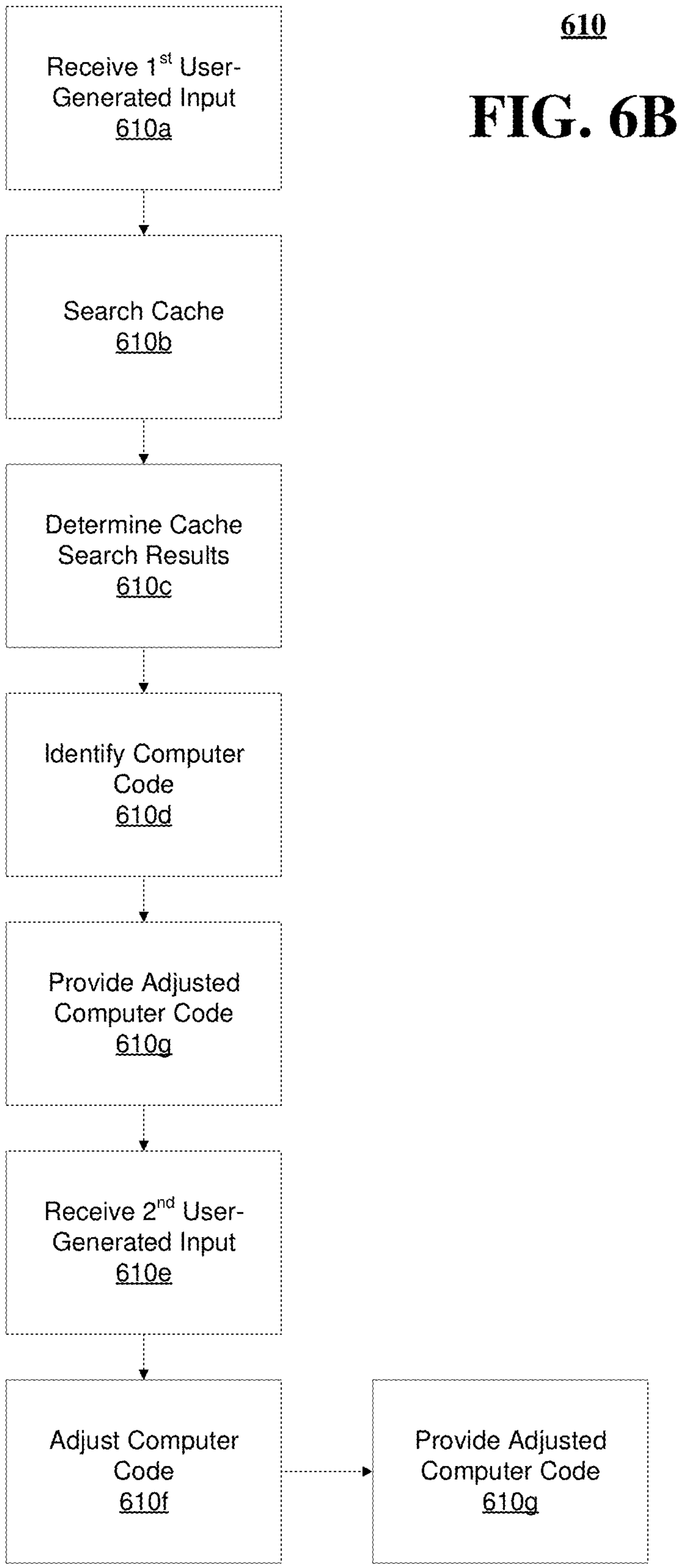

Referring to FIG. 6B, the method 610 can be implemented by a server. The method 610 can include the server, at 610*a*, receiving first user-generated input from a first communication device associated with a first user. The first user-generated input comprises a prompt that indicates to generate computer code. Further, the method 610 can include the server, at 610*b*, searching a cache comprising a group of computer code based on the prompt. In addition, the method 610 can include the server, at 610*c*, determining that there are cache search results associated with the computer code in response to the searching of the cache. The cache search results include a portion of the group of computer code. Also, the method 610 can include the server, at 610*d*, identifying the computer code from the cache search results. Further, the method 610 can include the server providing the computer code to a second communication device associated with a second. In addition, the method 610 can include the server, at 610*e*, receiving second user-generated input from the second communication device. Also, the method 610 can include the server, at 610*f*, adjusting the computer code based on the second user-generated input resulting in an adjusted computer code. Further, the method 610 can include the server, at 610*g*, providing the adjusted computer code to the first communication device.

While for purposes of simplicity of explanation, the respective processes are shown and described as a series of blocks in FIGS. 2, 3, 4, 5A, 5B, 6A, and 6B it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein. One or more blocks in FIGS. 2, 3, 4, 5A, 5B, 6A, and 6B can be performed in response to one or more other blocks in FIGS. 2, 3, 4, 5A, 5B, 6A, and 6B.

Portions of some embodiments can be combined with portions of other embodiments.

Figure 7:
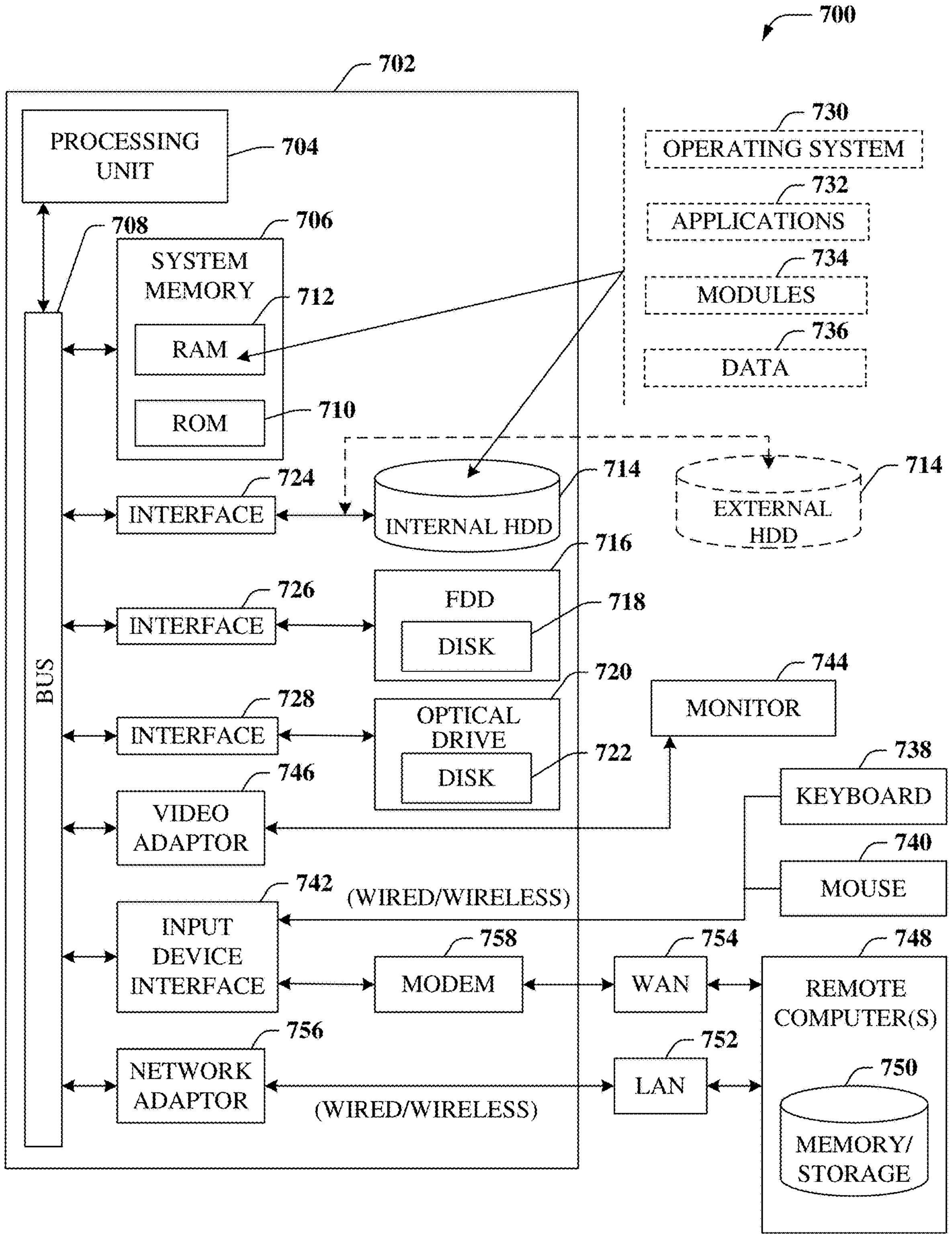
FIG. 7 is a block diagram of an example, non-limiting embodiment of a computing environment in accordance with various aspects described herein.

Turning now to FIG. 7, there is illustrated a block diagram of a computing environment in accordance with various aspects described herein. In order to provide additional context for various embodiments of the embodiments described herein, FIG. 7 and the following discussion are intended to provide a brief, general description of a suitable computing environment 700 in which the various embodiments of the subject disclosure can be implemented. For example, computing environment 700 can facilitate in whole or in part generating computer code utilizing AI. Each of server 100*a*, communication device 100*c*, and communication device 100*e* can comprise a computing environment 700.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 7, the example environment can comprise a computer 702, the computer 702 comprising a processing unit 704, a system memory 706 and a system bus 708. The system bus 708 couples system components including, but not limited to, the system memory 706 to the processing unit 704. The processing unit 704 can be any of various commercially available processors. Dual microprocessors and other multiprocessor architectures can also be employed as the processing unit 704.

The system bus 708 can be any of several types of bus structure that can bus, and a local bus using any of a variety of commercially available bus architectures. The system memory 706 comprises ROM 710 and RAM 712. A basic input/output system (BIOS) can be stored in a non-volatile memory such as ROM, erasable programmable read only memory (EPROM), EEPROM, which BIOS contains the basic routines that help to transfer information between elements within the computer 702, such as during startup. The RAM 712 can also comprise a high-speed RAM such as static RAM for caching data.

The computer 702 further comprises an internal hard disk drive (HDD) 714 (e.g., EIDE, SATA), which internal HDD 714 can also be configured for external use in a suitable chassis (not shown), a magnetic floppy disk drive (FDD) 716, (e.g., to read from or write to a removable diskette 718) and an optical disk drive 720, (e.g., reading a CD-ROM disk 722 or, to read from or write to other high-capacity optical media such as the DVD). The HDD 714, magnetic FDD 716 and optical disk drive 720 can be connected to the system bus 708 by a hard disk drive interface 724, a magnetic disk drive interface 726 and an optical drive interface 728, respectively. The hard disk drive interface 724 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 702, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 712, comprising an operating system 730, one or more application programs 732, other program modules 734 and program data 736. All or portions of the operating system, applications, modules, and/or data can also be cached in the RAM 712. The systems and methods described herein can be implemented utilizing various commercially available operating systems or combinations of operating systems.

A user can enter commands and information into the computer 702 through one or more wired/wireless input devices, e.g., a keyboard 738 and a pointing device, such as a mouse 740. Other input devices (not shown) can comprise a microphone, an infrared (IR) remote control, a joystick, a game pad, a stylus pen, touch screen or the like. These and other input devices are often connected to the processing unit 704 through an input device interface 742 that can be coupled to the system bus 708, but can be connected by other interfaces, such as a parallel port, an IEEE 1394 serial port, a game port, a universal serial bus (USB) port, an IR interface, etc.

A monitor 744 or other type of display device can be also connected to the system bus 708 via an interface, such as a video adapter 746. It will also be appreciated that in alternative embodiments, a monitor 744 can also be any display device (e.g., another computer having a display, a smart phone, a tablet computer, etc.) for receiving display information associated with computer 702 via any communication means, including via the Internet and cloud-based networks. In addition to the monitor 744, a computer typically comprises other peripheral output devices (not shown), such as speakers, printers, etc.

The computer 702 can operate in a networked environment using logical connections via wired and/or wireless communications to one or more remote computers, such as a remote computer(s) 748. The remote computer(s) 748 can be a workstation, a server computer, a router, a personal computer, portable computer, microprocessor-based entertainment appliance, a peer device or other common network node, and typically comprises many or all of the elements described relative to the computer 702, although, for purposes of brevity, only a remote memory/storage device 750 is illustrated. The logical connections depicted comprise wired/wireless connectivity to a local area network (LAN) 752 and/or larger networks, e.g., a wide area network (WAN) 754. Such LAN and WAN networking environments are commonplace in offices and companies, and facilitate enterprise-wide computer networks, such as intranets, all of which can connect to a global communications network, e.g., the Internet.

When used in a LAN networking environment, the computer 702 can be connected to the LAN 752 through a wired and/or wireless communication network interface or adapter 756. The adapter 756 can facilitate wired or wireless communication to the LAN 752, which can also comprise a wireless AP disposed thereon for communicating with the adapter 756.

When used in a WAN networking environment, the computer 702 can comprise a modem 758 or can be connected to a communications server on the WAN 754 or has other means for establishing communications over the WAN 754, such as by way of the Internet. The modem 758, which can be internal or external and a wired or wireless device, can be connected to the system bus 708 via the input device interface 742. In a networked environment, program modules depicted relative to the computer 702 or portions thereof, can be stored in the remote memory/storage device 750. It will be appreciated that the network connections shown are example and other means of establishing a communications link between the computers can be used.

The computer 702 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 8:
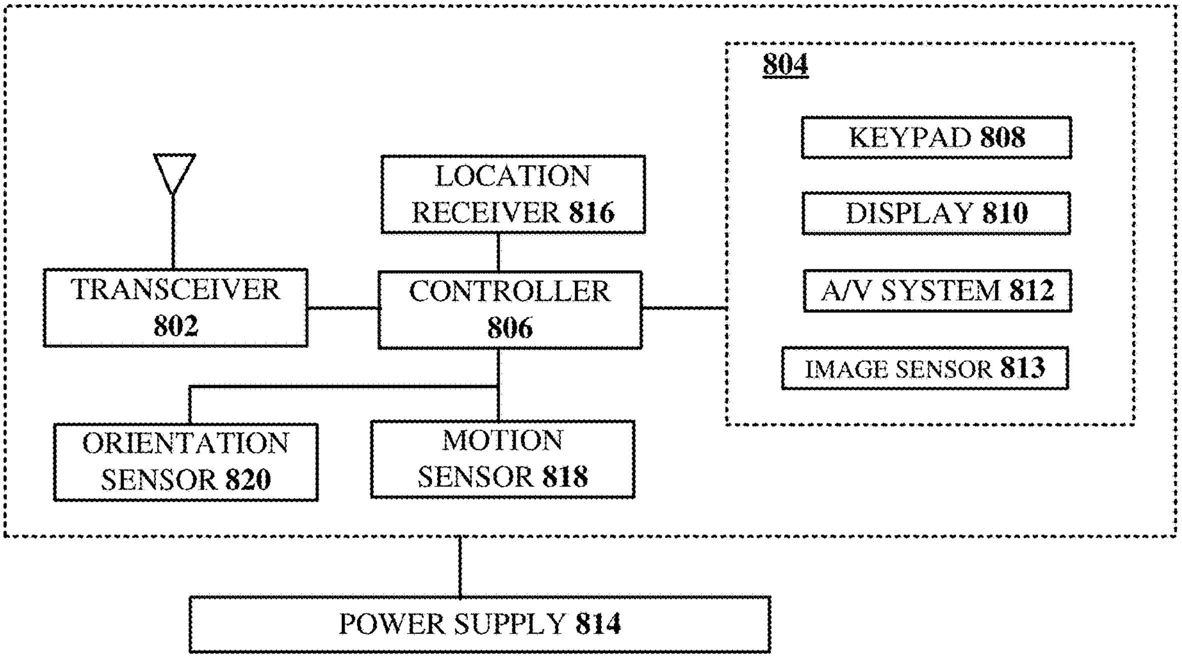
FIG. 8, block diagram of an example, non-limiting embodiment of a communication device 800 in accordance with various aspects described herein.

Turning now to FIG. 8, an illustrative embodiment of a communication device 800 is shown. The communication device 800 can serve as an illustrative embodiment of devices. For example, communication device 800 can facilitate in whole or in part generating computer code utilizing AI. Each of server 100*a*, communication device 100*c*, and communication device 100*e* can comprise a communication device 800.

The communication device 800 can comprise a wireline and/or wireless transceiver 802 (herein transceiver 802), a user interface (UI) 804, a power supply 814, a location receiver 816, a motion sensor 818, an orientation sensor 820, and a controller 806 for managing operations thereof. The transceiver 802 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 802 can also be adapted to support circuit-switched wireline access technologies (such as PSTN), packet-switched wireline access technologies (such as TCP/IP, VoIP, etc.), and combinations thereof.

The UI 804 can include a depressible or touch-sensitive keypad 808 with a navigation mechanism such as a roller ball, a joystick, a mouse, or a navigation disk for manipulating operations of the communication device 800. The keypad 808 can be an integral part of a housing assembly of the communication device 800 or an independent device operably coupled thereto by a tethered wireline interface (such as a USB cable) or a wireless interface supporting for example Bluetooth®. The keypad 808 can represent a numeric keypad commonly used by phones, and/or a QWERTY keypad with alphanumeric keys. The UI 804 can further include a display 810 such as monochrome or color LCD (Liquid Crystal Display), OLED (Organic Light Emitting Diode) or other suitable display technology for conveying images to an end user of the communication device 800. In an embodiment where the display 810 is touch-sensitive, a portion or all of the keypad 808 can be presented by way of the display 810 with navigation features.

The display 810 can use touch screen technology to also serve as a user interface for detecting user input. As a touch screen display, the communication device 800 can be adapted to present a user interface having graphical user interface (GUI) elements that can be selected by a user with a touch of a finger. The display 810 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 810 can be an integral part of the housing assembly of the communication device 800 or an independent device communicatively coupled thereto by a tethered wireline interface (such as a cable) or a wireless interface.

The UI 804 can also include an audio system 812 that utilizes audio technology for conveying low volume audio (such as audio heard in proximity of a human ear) and high-volume audio (such as speakerphone for hands free operation). The audio system 812 can further include a microphone for receiving audible signals of an end user. The audio system 812 can also be used for voice recognition applications. The UI 804 can further include an image sensor 813 such as a charged coupled device (CCD) camera for capturing still or moving images.

The power supply 814 can utilize common power management technologies such as replaceable and rechargeable batteries, supply regulation technologies, and/or charging system technologies for supplying energy to the components of the communication device 800 to facilitate long-range or short-range portable communications. Alternatively, or in combination, the charging system can utilize external power sources such as DC power supplied over a physical interface such as a USB port or other suitable tethering technologies.

The location receiver 816 can utilize location technology such as a global positioning system (GPS) receiver capable of assisted GPS for identifying a location of the communication device 800 based on signals generated by a constellation of GPS satellites, which can be used for facilitating location services such as navigation. The motion sensor 818 can utilize motion sensing technology such as an accelerometer, a gyroscope, or other suitable motion sensing technology to detect motion of the communication device 800 in three-dimensional space. The orientation sensor 820 can utilize orientation sensing technology such as a magnetometer to detect the orientation of the communication device 800 (north, south, west, and east, as well as combined orientations in degrees, minutes, or other suitable orientation metrics).

The communication device 800 can use the transceiver 802 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 806 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 800.

Other components not shown in FIG. 8 can be used in one or more embodiments of the subject disclosure. For instance, the communication device 800 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x_1, x_2, x_3, x_4 \ldots x_n)$, to a confidence that the input belongs to a class, that is, $f(x)$ =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data. Computer-readable storage media can comprise the widest variety of storage media including tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:

a processing system including a processor; and a memory that stores executable instructions that, when executed by the processing system, facilitate performance of operations, the operations comprising:

receiving, over a communication network, first user-generated input from a first communication device associated with a first user, wherein the first user-generated input comprises a prompt that indicates to generate computer code;

determining a purpose associated with the prompt and the computer code;

searching a cache comprising a group of computer code based on the prompt and the purpose associated with the prompt;

determining that there are cache search results associated with the purpose of the computer code in response to the searching of the cache;

sorting and filtering the cache search results based on a most usage sort resulting in first sorted cache search results;

sorting and filtering the first sorted cache search results based on a smallest code size sort resulting in second sorted cache search results;

sorting and filtering the second sorted cache search results based on a least complexity sort resulting in third sorted cache search results, wherein the least complexity sort comprises a least number of if-then statements;

identifying the computer code from the third sorted cache search results; and providing the computer code to a second communication device associated with a second user.

2. The device of claim 1, wherein the operations further comprise:

receiving second user-generated input from the second communication device; and adjusting the computer code based on the second user-generated input resulting in an adjusted computer code.

3. The device of claim 2, wherein the operations further comprise providing the adjusted computer code to the first communication device.

4. The device of claim 2, wherein the operations further comprise storing the adjusted computer code in the cache.

5. The device of claim 2, wherein the operations further comprise:

determining a complexity of the computer code; and providing the complexity of the computer code to the second communication device.

6. The device of claim 5, wherein the adjusting of the computer code comprises adjusting the computer code based on the complexity of the computer code.

7. The device of claim 6, wherein the adjusting the computer code based on the complexity of the computer code comprises adjusting the computer code by reducing the complexity of the computer code.

8. The device of claim 6, wherein the adjusting the computer code based on the complexity of the computer code comprises reducing a size of the computer code.

9. The device of claim 2, wherein the operations further comprise:

determining compliance changes associated with the computer code; and providing the compliance changes to the second communication device.

10. The device of claim 9, wherein the adjusting of the computer code comprises adjusting the computer code based on the compliance changes.

11. A non-transitory machine-readable medium, comprising executable instructions that, when executed by a processing system including a processor, facilitate performance of operations, the operations comprising:

receiving, over a communication network, first user-generated input from a first communication device associated with a first user, wherein the first user-generated input comprises a prompt that indicates to generate computer code;

determining a purpose associated with the prompt and the computer code;

searching a cache comprising a group of computer code based on the prompt and the purpose associated with the prompt;

determining that there are cache search results associated with the purpose of the computer code in response to the searching of the cache;

sorting and filtering the cache search results based on a most usage sort resulting in first sorted cache search results;

sorting and filtering the first sorted cache search results based on a smallest code size sort resulting in second sorted cache search results;

sorting and filtering the second sorted cache search results based on a least complexity sort resulting in third sorted cache search results, wherein the least complexity sort comprises a least number of if-then statements;

identifying the computer code from the third sorted cache search results; and providing the computer code to a second communication device associated with a second user;

receiving second user-generated input from a second communication device associated with a second user; and adjusting the computer code based on the second user-generated input resulting in an adjusted computer code.

12. The non-transitory machine-readable medium of claim 11, wherein the operations further comprise providing the adjusted computer code to the first communication device.

13. The non-transitory machine-readable medium of claim 11, storing the adjusted computer code in the cache.

14. The non-transitory machine-readable medium of claim 11, wherein the operations further comprise:

determining a complexity of the computer code; and providing the complexity of the computer code to the second communication device.

15. The non-transitory machine-readable medium of claim 14, wherein the adjusting of the computer code comprises adjusting the computer code based on the complexity of the computer code.

16. The non-transitory machine-readable medium of claim 15, wherein the adjusting the computer code based on the complexity of the computer code comprises adjusting the computer code by reducing the complexity of the computer code.

17. The non-transitory machine-readable medium of claim 15, wherein the adjusting the computer code based on the complexity of the computer code comprises reducing a size of the computer code.

18. The non-transitory machine-readable medium of claim 11, wherein the operations further comprise:

determining compliance changes associated with the computer code; and providing the compliance changes to the second communication device.

19. The non-transitory machine-readable medium of claim 18, wherein the adjusting of the computer code comprises adjusting the computer code based on the compliance changes.

20. A method, comprising:

receiving, over a communication network, by a processing system including a processor, first user-generated input from a first communication device associated with a first user, wherein the first user-generated input comprises a prompt that indicates to generate computer code;

determining, by the processing system, a purpose associated with the prompt and the computer code;

searching, by the processing system, a cache comprising a group of computer code based on the prompt, the purpose associated with the prompt, and a complexity metric, wherein the complexity metric is based on a number of logic statements in each of the group of computer code;

determining, by the processing system, that there are cache search results associated with the purpose of the computer code in response to the searching of the cache based on the prompt, the purpose associated with the prompt, and the complexity metric, wherein the cache search results include a portion of the group of computer code;

sorting and filtering, by the processing system, the cache search results based on a most usage sort resulting in first sorted cache search results;

sorting and filtering, by the processing system, the first sorted cache search results based on a smallest code size sort resulting in second sorted cache search results;

sorting and filtering, by the processing system, the second sorted cache search results based on a least complexity sort resulting in third sorted cache search results;

identifying, by the processing system, the computer code from the third sorted cache search results;

providing, by the processing system, the computer code to a second communication device associated with a second user;

receiving, by the processing system, second user-generated input from the second communication device;

adjusting, by the processing system, the computer code based on the second user-generated input resulting in an adjusted computer code; and providing, by the processing system, the adjusted computer code to the first communication device.

* * * * *